INVENTOR.
Raymond J. Miller
BY
O. H. Fowler
ATTORNEY.

INVENTOR.
BY RAYMOND J. MILLER
ATTORNEY.

Patented Jan. 16, 1945

2,367,364

UNITED STATES PATENT OFFICE 2,367,364

FLUID COUPLING

Raymond J. Miller, Detroit, Mich., assignor to Hydraulic Brake Company, Detroit, Mich., a corporation of California Application October 3, 1942, Serial No. 460,647

3 Claims. (Cl. 60—54)

This invention relates to fluid couplings.

Broadly the invention comprehends a fluid coupling including a driving and driven member providing in conjunction with one another a fluid circuit and automatically actuated means for control of the circuit during operation of the coupling.

An object of the invention is to provide a fluid coupling including an impeller and a runner providing in conjunction with one another a fluid circuit, and means for control of the circuit actuated by centrifugal force introduced by rotation of the coupling.

Another object of the invention is to provide a fluid coupling including an impeller and runner providing in conjunction with one another a fluid circuit, and means for control of the circuit actuated by pressure on the fluid in the circuit and by centrifugal force introduced by rotation of the unit.

Other objects and advantages of the invention will appear from the following description taken in connection with the drawings forming a part of this specification, and in which—

Figure 1:
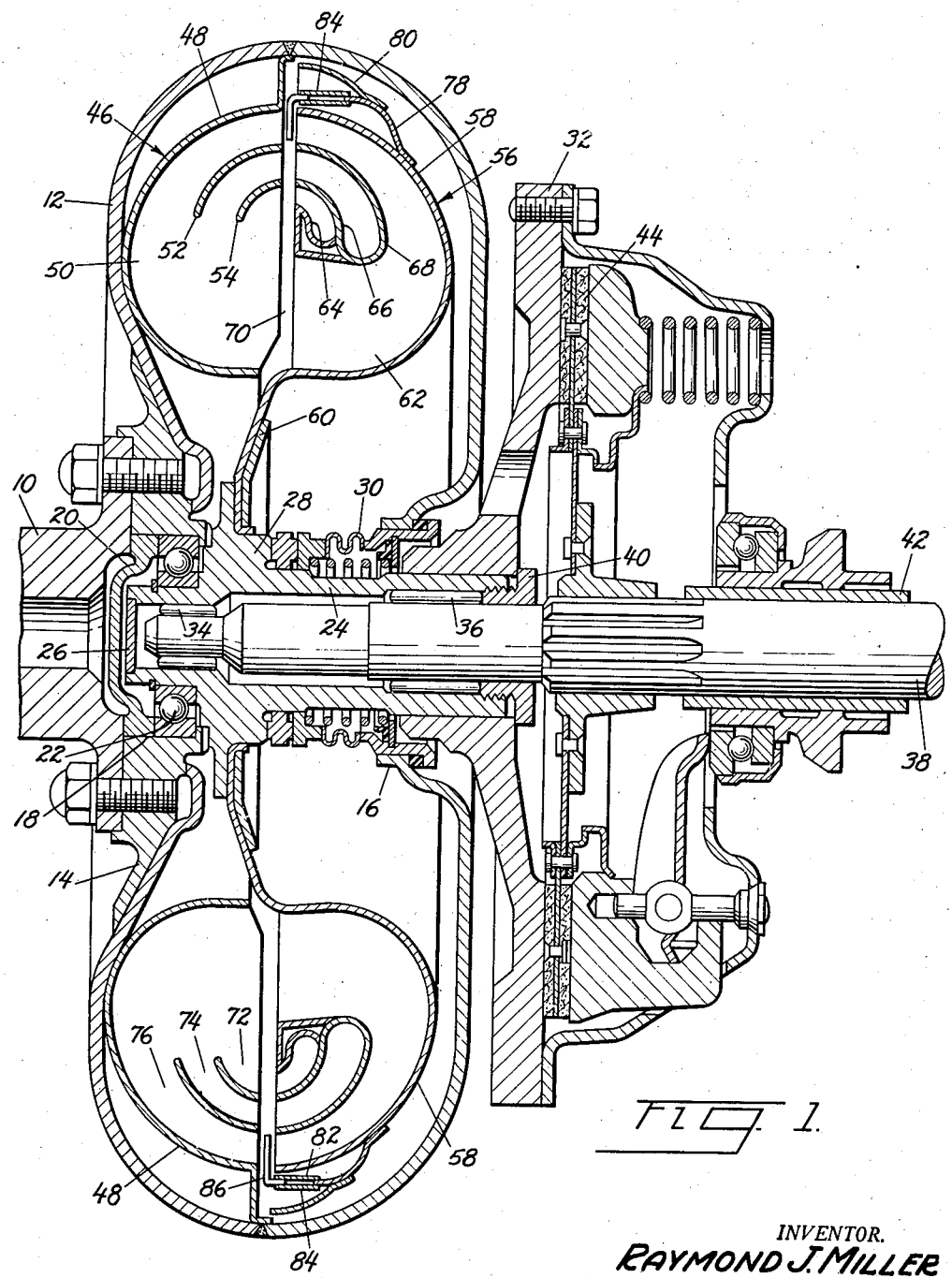
Fig. 1 is a vertical sectional view of a fluid coupling embodying the invention.
Figure 2:
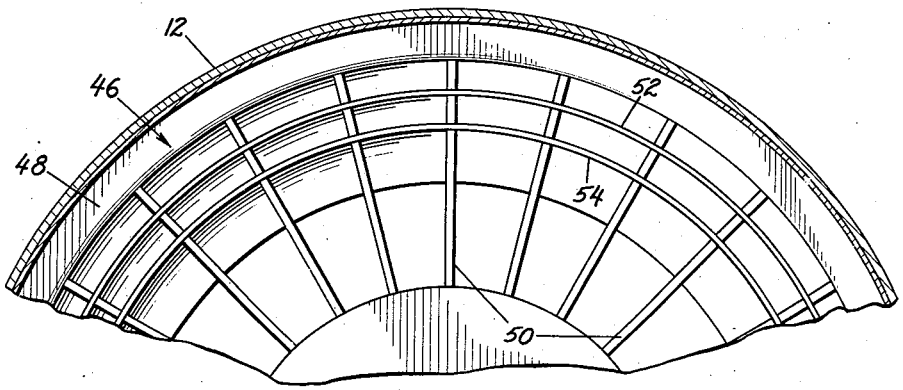
Fig. 2 is a fragmentary view of the impeller.
Figure 3:
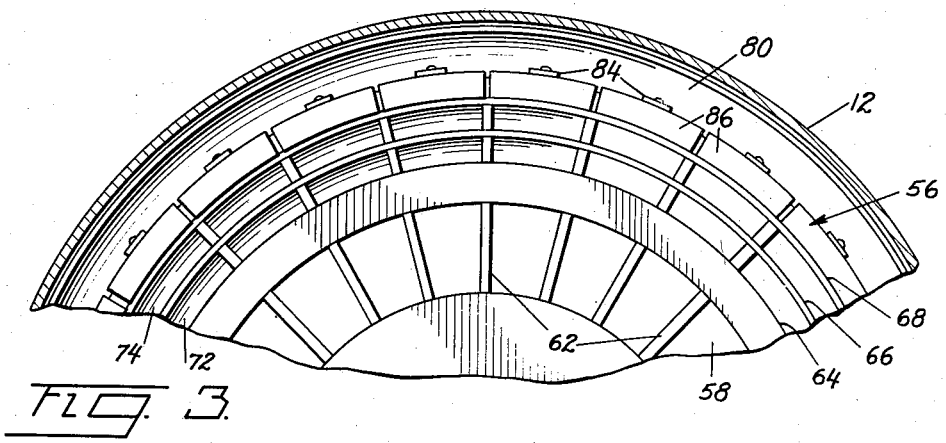
Fig. 3 is a fragmentary view of the runner.
Figure 4:
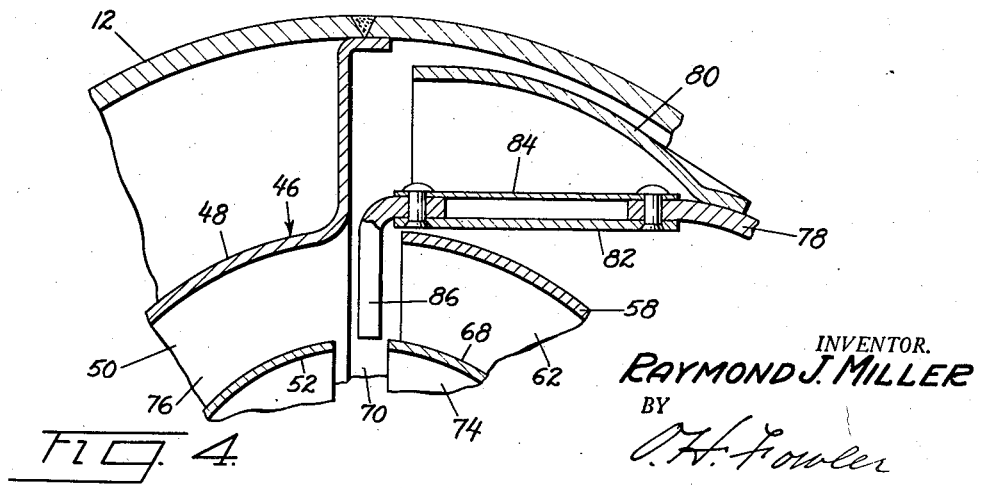
Fig. 4 is an enlarged detail view of the shutter.

Referring to the drawings for more specific details of the invention, 10 represents a driving shaft supporting a housing 12. As shown, the housing includes a circular case having a concentrically disposed hub 14 bolted or otherwise secured to the shaft 10 and a hub 16 arranged in oppositely disposed relation to the hub 14, and the hub 14 has therein an axial bore 18, and filled in this bore is a closure plate 20 and a bearing 22.

A sleeve 24 supported for rotation on the bearing 22 in axial alignment with the driving shaft 10 extends through the hub 16. The sleeve has one end closed as by a plug 26. This end of the sleeve has a circumferential flange 28, and interposed between this flange and the hub 16 is a fluid seal 30 for inhibiting seepage of fluid from the housing, and splined to the other end of the sleeve is a clutch member 32.

Pin bearings 34 and 36 arranged in spaced relation to one another in the sleeve 24 support for rotation a driven shaft 38; and a retaining ring 40 sleeved on the driven shaft, and secured to the sleeve, serves to retain the clutch member 32 against displacement. The driven shaft extends through a sleeve 42 on a transmission housing, not shown, and splined on the driven shaft for rotation therewith and relative axial movement is a clutch member 44 for cooperation with the clutch member 32.

An impeller indicated generally at 46 includes an outer shroud 48 secured to the inner wall of the housing 12. This outer shroud has thereon spaced blades 50 supporting inner shrouds 52 and 54, and these inner shrouds are arranged in substantially parallel spaced relation to one another and to the outer shroud 48 and extend from the edges of the blades arcuately and inwardly of the blades.

A runner indicated generally at 56 includes an outer shroud 58 secured to the flange 28 on the rotatable sleeve 24 and braced as by a ring 60. The outer shroud 58 has thereon blades 62 supporting inner shrouds 64, 66 and 68 arranged in spaced relation to one another and to the outer shroud 58. The shrouds 66 and 68 register with the shrouds 52 and 54 of the impeller, and are contiguous with one another, and the shroud 64 is contiguous with the shroud 66.

The impeller 46 and the runner 56 are assembled in oppositely disposed relation to one another with small clearance therebetween providing a gap 70, and the relation of the shrouds 52 and 54 on the impeller to the shrouds 64, 66 and 68 on the runner are such as to provide a short dead end circuit 72, a relatively long dead end circuit 74, and a continuous circuit 76, and these circuits are intersected by the gap 70.

The structure hereinabove described constitutes the basis of a copending application for improvement in Fluid couplings, filed April 5, 1941, Serial No. 387,096, of which this application is a continuation-in-part, and is recited here solely to provide a suitable background for the instant invention. In fluid couplings of this particular type, and, in fact, many other types, there is an inherent drag between the driving and driven member due to a differential in speed of the driving and driven members. The maximum drag occurs when the driven member is substantially at rest and the driving member is rotating at a speed just sufficient to cause the runner to rotate. The instant invention aims to overcome this difficulty.

As shown, in the preferred embodiment of the invention, illustrated in Figs. 1, 2, 3 and 4, the shroud 58 of the runner 56 has thereon a bracket 78 supporting a hood 80 extended substantially to the inner wall of the housing adjacent the periphery thereof so as to reduce fluid flow from the gap 70 between the impeller and associated runner.

Springs 82 and 84 are mounted on the bracket 78 in spaced pairs, and each pair of springs supports a shutter 86 normally at rest in the gap 70 so as to effectively close the circuit 76. The spring 82 is a heavy tension spring, and the spring 84 is a relatively light compression spring. Thus, when the shutter 86 moves from the gap 70 under the influence of centrifugal force introduced upon rotation of the coupling, the spring 82 is placed under tension and the spring 84 is placed under compression. This results in movement or withdrawal of the shutter 86 from the gap 70 in substantially a vertical plane parallel to the edges of the blades of the impeller and the runner.

Figure 5:
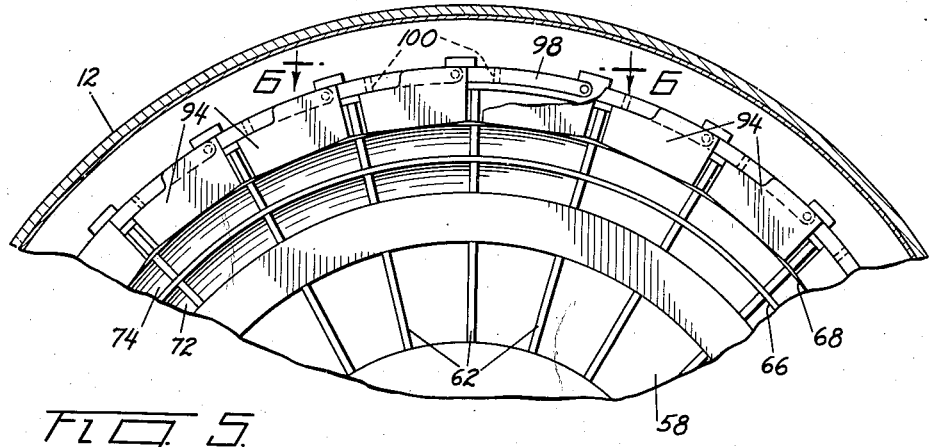
Fig. 5 is a front elevation of a runner, partly broken away, illustrating a modification of the invention.
Figure 6:
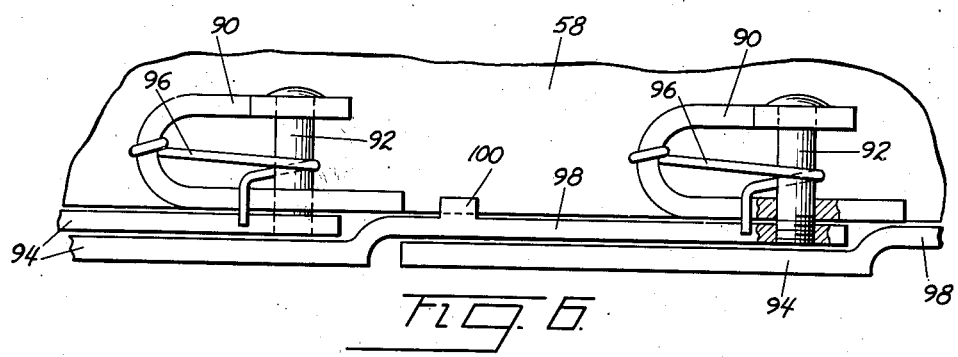
Fig. 6 is a sectional view substantially on line 6—6, Fig. 5.
Figures 7, 8:
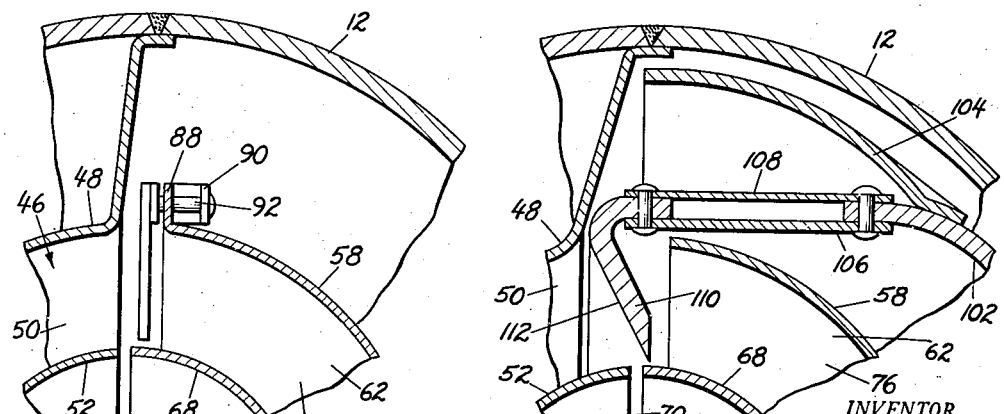
Fig. 7 is a fragmentary view of the structure illustrated in Figs. 5 and 6.
Fig. 8 is a fragmentary view of a fluid coupling embodying another modification of the invention.

Another modification of the invention is illustrated in Figs. 5 and 7. In this embodiment of the invention, the shroud 58 has a flange 88 sectionalized and deformed to provide a plurality of spaced yokes 90 supporting pintles 92 having fixedly secured thereto shutters 94 normally retained in the circuit 76 by springs 98 embracing the pintles, and having their respective ends secured to the yokes and engaging the shutters. As shown, the shutters 94 have shanks 98 provided with stops 100 adapted to engage the rim of the shroud 58 so as to limit the movement of the shutter into the circuit 76 and to support the shutters in the position of rest. Upon rotation of the coupling, the shutters 94 move from the circuit 76 under the influence of centrifugal force, and this movement of the shutters is proportionate to the speed of rotation of the coupling.

Another modification of the invention is illustrated in Fig. 8. In this embodiment of the invention a bracket 102 supports a cowl 104 extended substantially to the inner wall of the coupling so as to restrict fluid flow from the associated impeller and runner, the blades of which are cut away, as shown, to increase the gap therebetween, principally that portion of the gap intersecting the outer circuit. Springs 106 and 108 mounted in spaced pairs on the bracket 102 support shutters 110 in the outer circuit of the coupling between the blades of the impeller and the runner. As shown, the springs 106 are heavy tension springs, and the springs 108 are relatively light compression springs arranged immediately above and in parallel relation to the tension springs, and the shutters 110 secured between the free ends of these springs are of such contour as to provide an inclined face 112 presented as the coupling approaches the position of rest to the fluid flow in the circuit. In this embodiment of the invention, upon rotation of the coupling, the shutter is moved from the fluid circuit under the influence of centrifugal force against the resistance of the springs 106 and 108, and the centrifugal force moving the shutters is augmented by the energy of the fluid in the circuit received on the inclined faces 112 of the shutters. These forces move the shutters from the circuit, and the springs 106 and 108 control the movement to such an extent that movement of the shutters is substantially in a plane parallel to the plane of rotation of the coupling.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid coupling comprising an impeller, a runner opposed thereto and providing in conjunction therewith a fluid circuit, and gates mounted on the exterior of the runner and projecting into the circuit between the exit of the impeller and the entrance to the runner for closing the circuit activated by dynamic pressure on the fluid in the circuit and centrifugal force to open the circuit.

2. A fluid coupling comprising an impeller and a runner providing in conjunction with one another a fluid circuit and means mounted on the exterior of the runner, having a portion normally projected into the circuit between the impeller and runner for closing the circuit therebetween, said means operative to move radially completely from the circuit under the influence of dynamic pressure on the fluid in the circuit and centrifugal force imparted by rotation of the runner.

3. A fluid coupling comprising an impeller and a runner providing in conjunction with one another a fluid circuit and means mounted on the exterior of the runner comprising parallel springs normally supporting gates between the exit of the impeller and entrance to the runner, said gates being acted upon by dynamic pressure on the fluid in the circuit and the springs by centrifugal force due to the rotation of the runner to move the gates out of the fluid circuit and provide for free circulation of the fluid in the circuit.

RAYMOND J. MILLER.